United States Patent
Eaton (10) Patent No.: US 8,054,577 B2
(45) Date of Patent: *Nov. 8, 2011

(54) TAPE ROLLER GUIDE WITH INTEGRAL RECORDING HEAD

(75) Inventor: James Howard Eaton, Morgan Hill, CA (US); Glynda Williams Eaton, legal representative, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 834 days.

This patent is subject to a terminal disclaimer.

(21) Appl. No.: 12/060,462

(22) Filed: Apr. 1, 2008

(65) Prior Publication Data

US 2008/0180841 A1   Jul. 31, 2008

Related U.S. Application Data (63) Continuation of application No. 11/279,096, filed on Apr. 7, 2006, now Pat. No. 7,460,332.

(51) Int. Cl.
*G11B 5/54* (2006.01)
*G11B 15/60* (2006.01)

(52) U.S. Cl. ... 360/83; 360/231; 360/261.1; 360/130.21

(58) Field of Classification Search ............. 360/130.21, 360/130.22, 130.23, 130.24, 231, 130.2, 360/129, 83, 84, 85, 93, 261.1
See application file for complete search history.

(56) References Cited

U.S. PATENT DOCUMENTS

| | | | |
|---|---|---|---|
| 2,735,900 A | 6/1951 | Wohlrab et al. | |
| 3,614,338 A | 10/1971 | Bogels | |
| 4,214,285 A | 7/1980 | Land | |
| 4,266,255 A | 5/1981 | Camras | |
| 5,159,505 A * | 10/1992 | Horiuchi et al. | 360/84 |
| 5,623,385 A | 4/1997 | Gunschmann et al. | |
| 5,883,770 A | 3/1999 | Biskeborn et al. | |
| 6,061,203 A | 5/2000 | Kim et al. | |
| 6,081,403 A | 6/2000 | Uetake et al. | |
| 6,188,535 B1 | 2/2001 | Lemke et al. | |
| 6,341,416 B1 | 1/2002 | Biskeborn et al. | |
| 6,590,741 B1 | 7/2003 | Hasegawa et al. | |
| 6,678,123 B2 | 1/2004 | Takayama et al. | |

(Continued)

FOREIGN PATENT DOCUMENTS

JP   4-102217 A * 4/1992

OTHER PUBLICATIONS

Notice of Allowance from U.S. Appl. No. 11/279,096 dated Jul. 1, 2008.

*Primary Examiner* — Jefferson Evans
(74) *Attorney, Agent, or Firm* — Shimokaji & Associates, P.C.

(57) ABSTRACT

An integral recording head, for use in a linear tape drive system, includes a circumferentially grooved roller guide assembly and a recording head actuator assembly. The circumferential groove feature is incorporated on the surfaces of the roller guide assembly, and provides a substantial frictional contact force that acts to reduce the lateral motion, and further attenuates high frequency lateral disturbances of the magnetic tape. The reduced high frequency content of the lateral disturbances significantly improves the ability of the actuator to achieve a desired track following control. The grooved roller guide assembly is formed integrally of two solid cylindrical contact surfaces separated by a circumferential slot that accommodates the recording head actuator assembly.

27 Claims, 9 Drawing Sheets

U.S. PATENT DOCUMENTS

| | | |
|---|---|---|
| 6,714,381 B2 | 3/2004 | Willems, Jr. |
| 6,816,336 B2 | 11/2004 | Tamura |
| 7,006,329 B2 * | 2/2006 | Johnson et al. ............... 360/221 |
| 7,260,884 B2 | 8/2007 | Athanasiou et al. |
| 7,800,863 B1 * | 9/2010 | Kartik ..................... 360/130.21 |
| 2001/0002158 A1 * | 5/2001 | Cope et al. ............... 360/130.21 |
| 2003/0016467 A1 | 1/2003 | Bui et al. |
| 2003/0048583 A1 | 3/2003 | Tanaka |

* cited by examiner

TAPE ROLLER GUIDE WITH INTEGRAL RECORDING HEAD

FIELD OF THE INVENTION

The present invention relates in general to data storage systems and in particular to linear tape drive systems. More specifically, the present invention provides a new design for substantially improving track density in linear tape drive systems.

BACKGROUND OF THE INVENTION

Magnetic media represent a common form of digital data storage for computer systems. Among the magnetic storage systems, linear tape drive systems are in use in many enterprise applications for data management. Magnetic media are also currently used in hard disk drive systems. Hard drive systems typically have a larger storage capability than linear tape drive systems owing to their higher areal density, linear density, and track density. Areal density is a physical measure of storage systems that relates the number of data bits per unit surface area of magnetic storage media. Similarly, linear density is a measure of the number of data bits per unit length of data tracks, and track density is the number of data tracks that can be packed into a given form of magnetic media. In general, a larger density value corresponds to a higher storage capacity for a magnetic storage system.

In one conventional tape design, the roller guide assembly employs a smooth surface with which the magnetic tape is in contact during a read write operation. The smooth roller surface does not allow for a sufficient frictional contact force to be developed thereon. The insufficient frictional contact force causes the magnetic tape to develop a significant lateral motion during a read write operation.

Yet another problem with the conventional design of linear tape drive systems is the large spacing between the rollers, which causes the magnetic tape to be unsupported over a large span. The unconstrained magnetic tape between the rollers tends to develop lateral motion that generates a high frequency lateral disturbance, as the magnetic tape leaves the rollers and the supply reels, that can propagate to the recording head.

The performance of conventional linear tape drive systems is further inhibited by placing the actuator containing the recording head distally from the rollers. As a result, any lateral disturbance in the magnetic tape will propagate to the recording head. Typically, the actuator that houses the recording head is designed to perform track following by closed-loop servo control. The track following servo control commands the actuator to move in the lateral direction so as to follow a target data track on the magnetic tape.

As the magnetic tape experiences high frequency lateral disturbances, the track following servo control may not be able to maintain the desired track following performance within its frequency bandwidth. The resulting error due to the inability of the actuator to follow a target data track, herein also referred to as a track following error, thus imposes a performance limitation on the track width of the magnetic tape (in a conventional design) in that it cannot be smaller than the track following error. This limitation thus dictates the track density of the conventional design of linear tape drive systems.

In view of the unresolved problems with the conventional designs of the linear tape drive, there is a need for an improved design that can effectively address the forgoing problems. Preferably, the improved design should be able to reduce substantially high frequency lateral disturbances of the magnetic tape. Moreover, the improved design should also be able to significantly reduce the track following error. By successfully resolving the forgoing concerns, an improved design should enable linear tape drive systems to achieve a higher track density, and hence a larger storage capacity.

SUMMARY OF THE INVENTION

It is a feature of the present invention to provide a new integral recording head for use in a linear tape drive system. The recording head includes a circumferentially grooved roller guide assembly and a recording head actuator assembly. The circumferential grooves are incorporated on the surfaces of the roller guide assembly, thereby providing substantial frictional contact force that acts to reduce the tape lateral motion and to attenuate any high frequency lateral disturbances of the magnetic tape. The reduced high frequency content of the lateral disturbances significantly improves the ability of the actuator to achieve a desired track following control.

In a preferred embodiment, the grooved roller guide assembly is formed integrally of two solid cylindrical contact surfaces separated by a circumferential slot having a constant width. The recording head actuator assembly includes a U-shaped head.

In another preferred embodiment, the grooved roller guide assembly is formed by two removable hollow cylindrical surfaces that are designed to accommodate, within a hollow interior space therebetween, a recording head actuator assembly that is not constrained to fit within a circumferential slot.

BRIEF DESCRIPTION OF THE DRAWINGS

The features of the present invention and the manner of attaining them will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
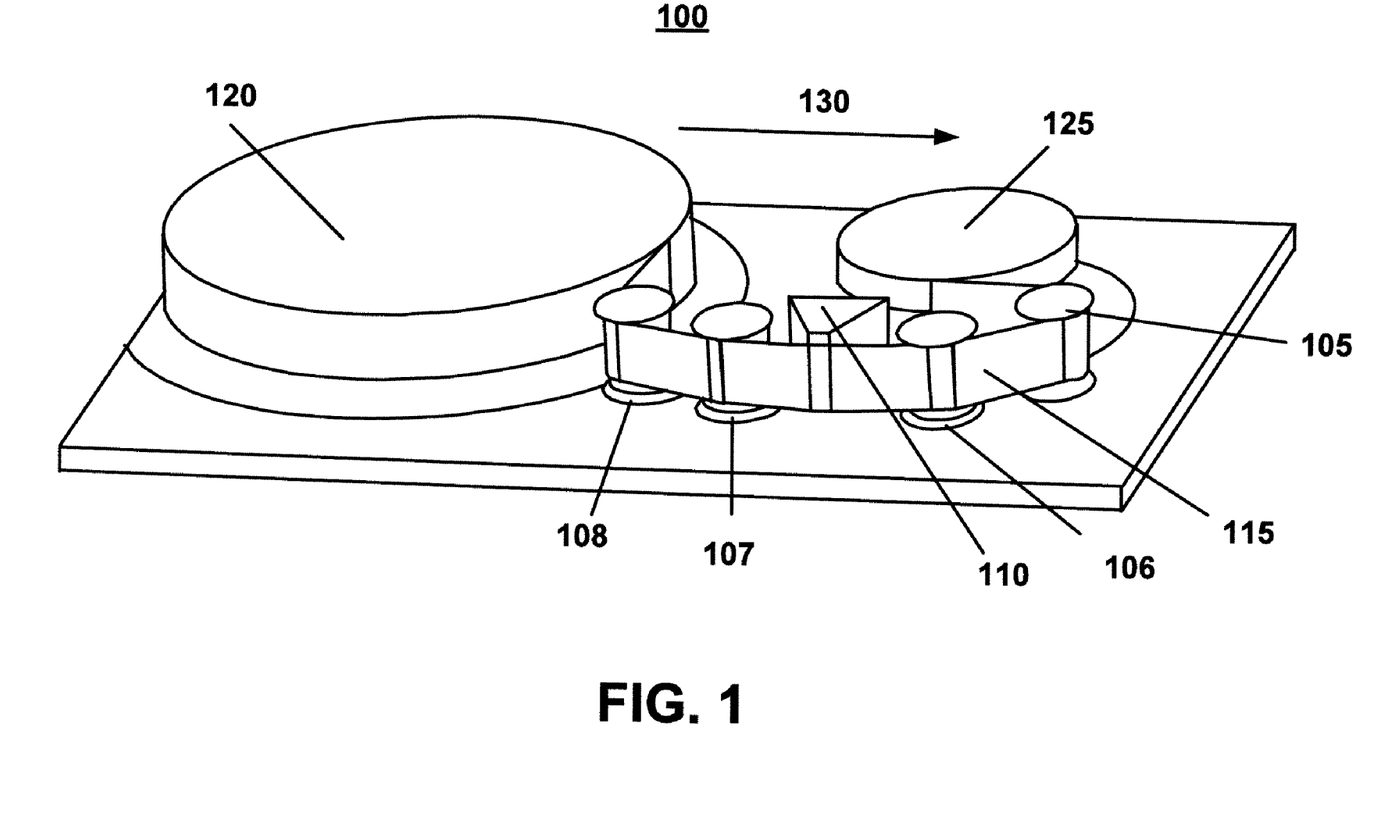
FIG. 1 is a perspective view of a conventional linear tape drive system.

FIG. 1 illustrates a conventional linear tape drive system 100 that comprises a plurality of roller guide assemblies, a recording head actuator assembly 110, a magnetic tape 115, a supply reel 120, and a take-up reel 125. The conventional roller guide assemblies 105, 106, 107, 108 are generally separated by a substantial distance from each other, which typically ranges from approximately 1 to 2 inches. Further, each of these roller guide assemblies 105, 106, 107, 108 generally has a relatively smooth surface that contacts the magnetic tape 115. The recording head actuator assembly 110 is also separated from the roller guide assemblies 105, 106, 107, 108 by a significant distance.

During a read write operation, the magnetic tape 115 is driven by the take-up reel 125 as its travel is guided by the roller guide assemblies 105, 106, 107, 108 and the recording head actuator assembly 110. The movement of the magnetic tape 115 causes the roller guide assemblies 105, 106, 107, 108 to rotate. The fixed locations of the roller guide assemblies 105, 106, 107, 108 significantly constrain the movement of the magnetic tape 115 along a tape path direction, and the smooth contact surfaces of the roller guide assemblies 105, 106, 107, 108 do not provide sufficient motion constraint for the magnetic tape 115 along the lateral direction that is denoted by the arrow 130.

The unconstrained lateral motion of the magnetic tape 115 over the open span between two contiguous roller guide assemblies, such as 107, 108, can generate lateral disturbances with high frequency components, which, in certain cases, can exceed the bandwidth limit of a track following servo control utilized by the recording head actuator assembly 110. The resulting track following error can therefore be significant and, as a result, it can impose a lower limit on the track width, which directly affects the track density of the magnetic tape 115.

Figure 2:
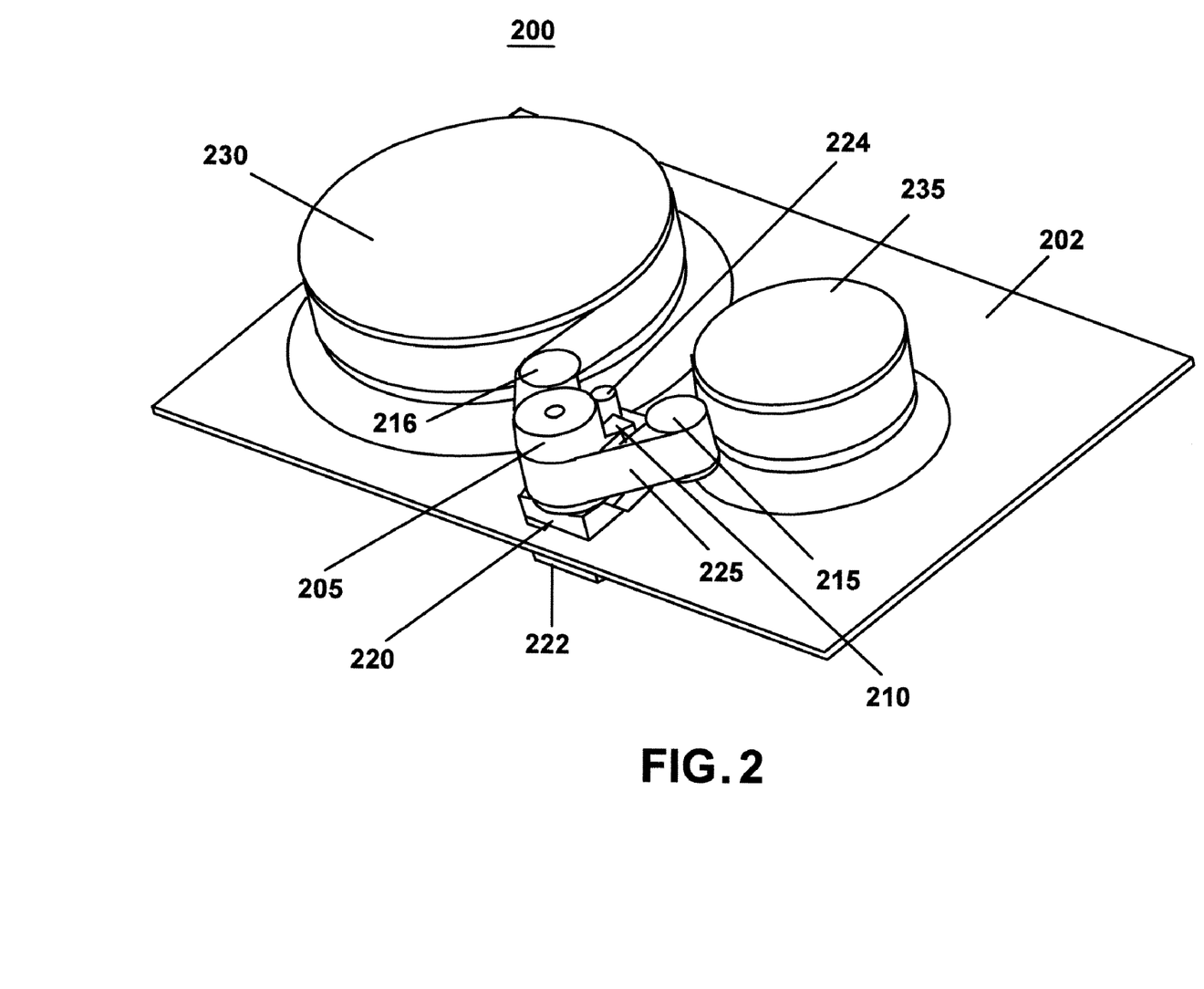
FIG. 2 is a perspective view of a linear tape drive system of the present invention, shown comprising a grooved roller guide assembly and a recording head actuator assembly.

FIG. 2 illustrates a linear tape drive system 200 of the present invention. The present linear tape drive system 200 generally comprises a platform 202, a grooved roller guide assembly 205, a recording head actuator assembly 210, a plurality of roller guide assemblies 215, 216, a top support base 220, a bottom support base 222, a lead screw actuator 224, a magnetic tape 225, a supply reel 230, and a take-up reel 235.

In a preferred embodiment, the recording head actuator assembly 210 is disposed, at least in part, within the grooved roller guide assembly 205. The roller guide assemblies 215, 216 may be of a conventional design similar to the conventional roller guide assemblies 105-108 or of the same design as the grooved roller guide assembly 205.

The top support base 220 is mounted on the upper surface of the platform 202, and supports the grooved roller guide assembly 205. The bottom support base 222 is mounted on the bottom surface of the platform 202, in alignment with the top support base 220.

The lead screw actuator 224 provides a coarse adjustment of the grooved roller guide assembly 205 along the lateral direction. The magnetic tape 225 can have a higher track density than that of the conventional magnetic tape 115 of FIG. 1. The supply reel 230 and the take-up reel 235 can be of a conventional design.

Figure 3:
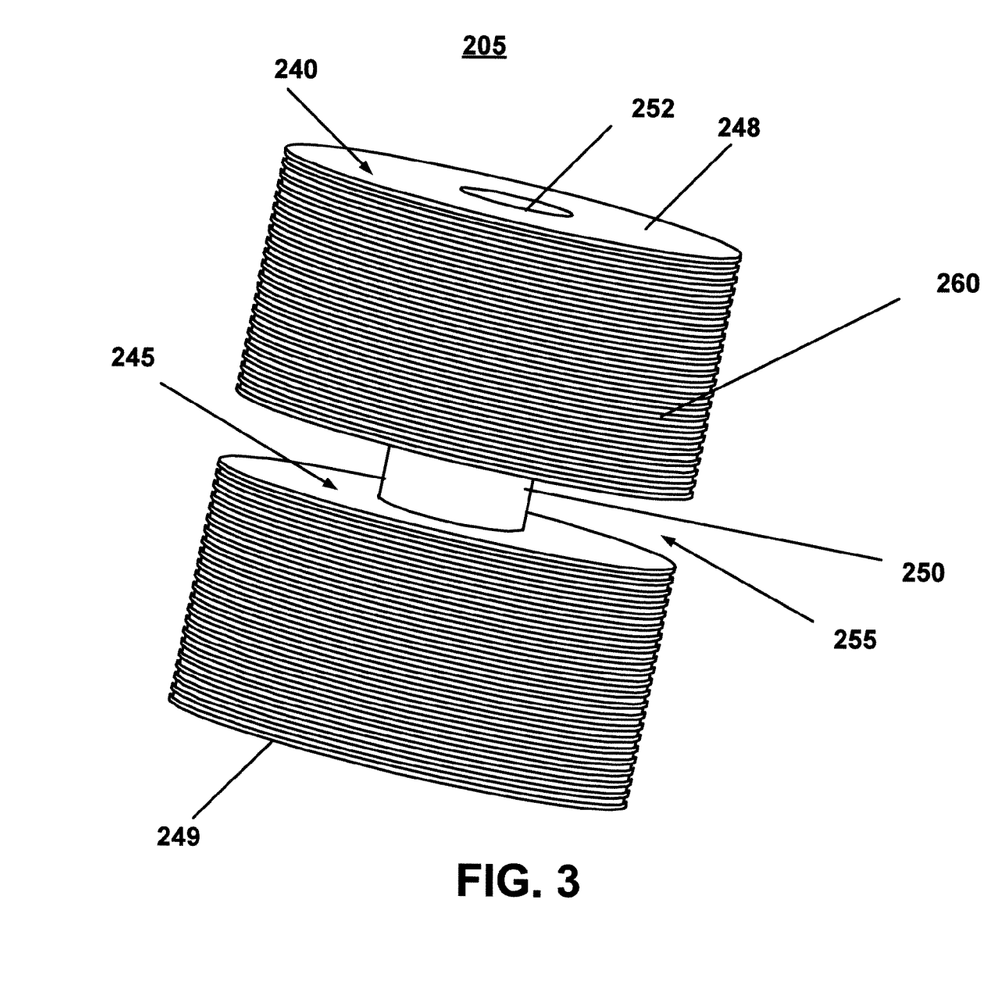
FIG. 3 is a perspective view of a preferred embodiment of the grooved roller guide assembly of FIG. 2, shown formed of two solid cylindrical surfaces with a circumferential slot therebetween.

FIG. 3 illustrates a preferred embodiment of the grooved roller guide assembly 205. The grooved roller guide assembly 205 is generally formed of two solid cylinders 240, 245 having the same or similar outer diameter. Cylinders 240, 245 are spaced apart by a gap that forms a circumferential slot 255, and are interconnected by a rigid connecting shaft 250. The connecting shaft 250 extends axially through the cylinders 240, 245 and between the two outer surfaces 248, 249 of the cylinders 240, 245, respectively.

The connecting shaft 250 has a hollow end 252 that allows the grooved roller guide assembly 205 to be mounted to the support base 220. The cylinders 240, 245 and the connecting shaft 250 can either be integrally formed, or alternatively, they can be individually formed and then assembled into a single integral unit.

Figure 4:
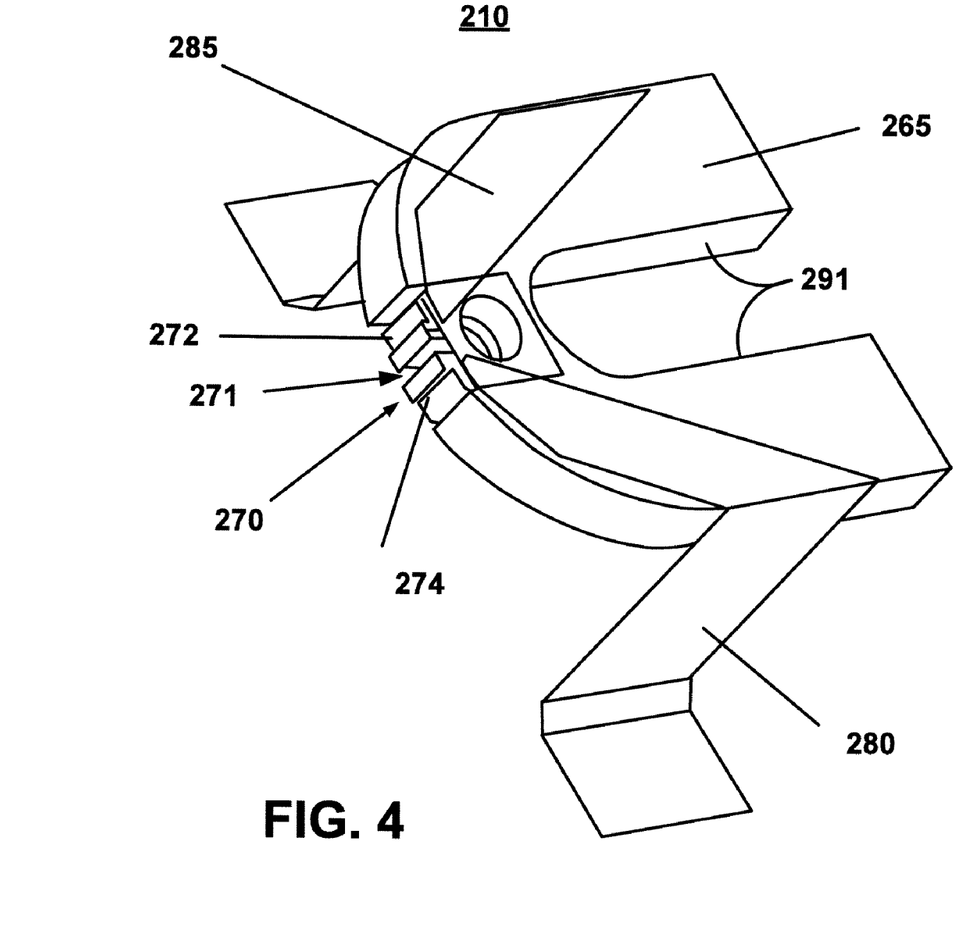
FIG. 4 is a perspective, enlarged view of a U-shaped recording head actuator assembly that fits within the circumferential slot in the grooved roller guide assembly of FIG. 2.

One feature of the present invention is the plurality of circumferential grooves 260 that are integrally formed on the surface of the cylinders 240 and 245. The circumferential grooves 260 have a raised profile, and are designed to eliminate the air bearing effect on the magnetic tape 225, by allowing the air to escape between the grooves 260. In so doing, the circumferential grooves 260 come into a direct contact with the magnetic tape 225, thereby generating a frictional contact force therebetween. This frictional contact force significantly reduces any relative motion developed between the magnetic tape 225 and the grooved roller guide assembly 205, thereby effectively reducing the amplitude and frequency of the lateral motion of the magnetic tape 225. The raised profile of the roller acts as a hydrodynamic air bearing surface for the tape 225, thereby preventing the tape 225 from sagging into the slot 255. The air bearing surface is configured to control a wrap angle on a recording head element 270 (FIG. 4). The recording head element 270 is movable within the slot 255 by approximately 0.1 mm to 0.2 mm.

Figure 5:
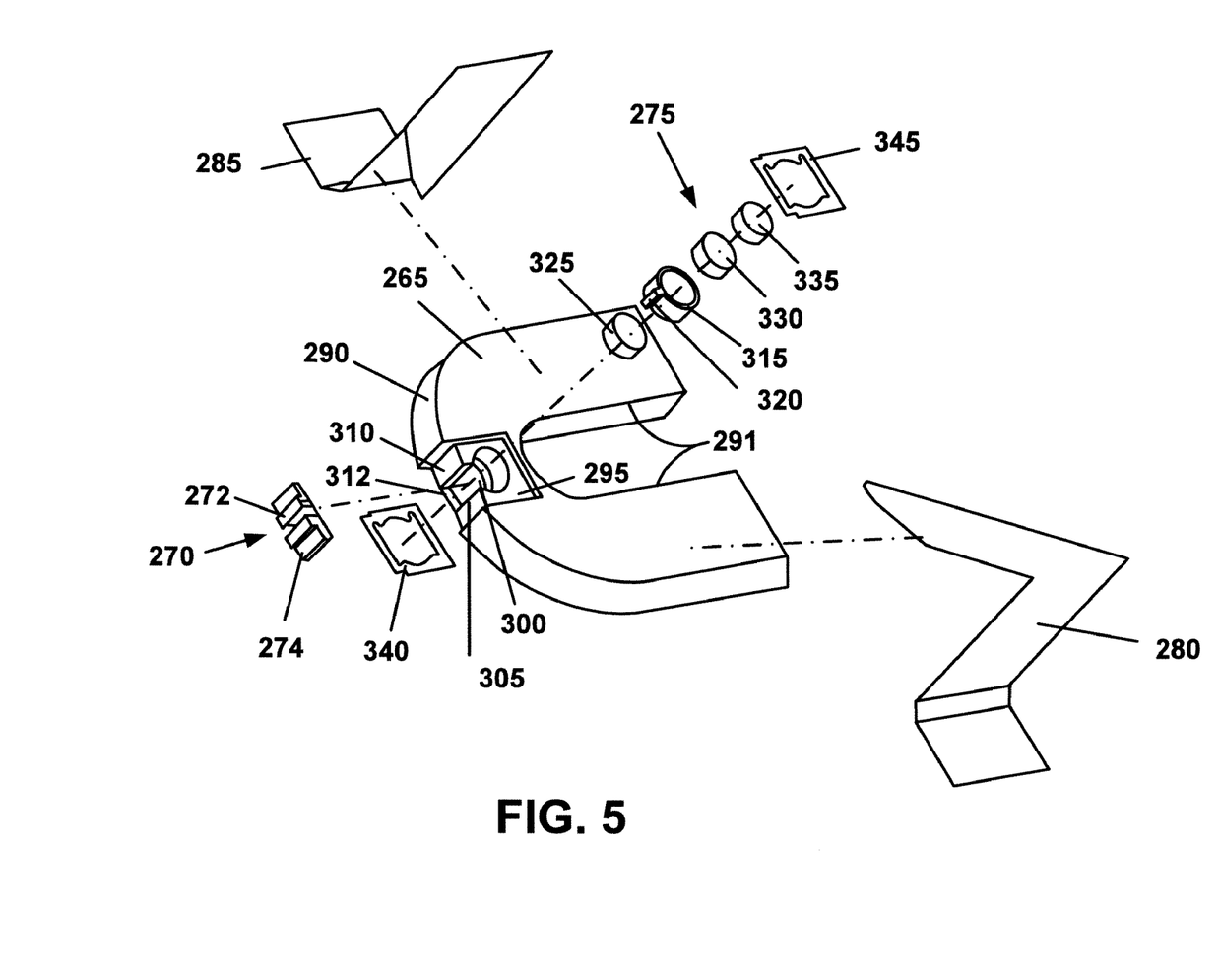
FIG. 5 is an exploded view of FIG. 4 showing a recording head, an actuator, and a U-shaped magnet that form the recording head actuator assembly of FIG. 4.

With reference to FIGS. 4 and 5, the recording head actuator assembly 210 includes a U-shaped carrier 265, the recording head element 270, a short stroke voice coil actuator 275, and two ribbon cables 280, 285 that are electrically connected to the recording head element 270. The U-shaped carrier 265 is generally constructed from a permeable ferromagnetic material and has a constant thickness of substantially the same width as the circumferential slot 255, in order to allow an inner U-shaped surface 291 of the carrier 265 to engage the rigid connecting shaft 250 within the slot 255, as further illustrated in FIG. 6. In one embodiment, the recording head actuator assembly 210 includes a high frequency, short stroke tracking system.

Further, the U-shaped carrier 265 has an arcuate outer contour 290 of substantially the same diameter as that of the cylinders 240 and 245. A rectangularly (or square)-shaped cutout 295 (FIG. 5) is formed in the U-shaped carrier 265 along the centerline of the cylindrical surface 290. A generally cylindrical cavity 300 is formed at the center of the cutout 295 and connects to a rectangular key way 305 that leads to a rectangular notch 310 that is formed on the cylindrical surface 290. A thin wall plate 312 is formed at the bottom of the circular cavity 300 to inhibit the magnetic flux from reading the head.

The voice coil actuator 275 includes a cylindrical coil 315 with an integrally formed rectangular key 320, a plurality of cylindrical magnets 325 and 330, a return path magnet 335, and two flexure elements 340, 345. The cylindrical coil 315 fits within the cylindrical cavity 300 and is rotationally constrained in the circumferential direction by the engagement of the key 320 within the keyway 305. The cylindrical magnets 325, 330 are generally made of a hard magnetic material and are placed within the cylindrical coil 315. The return path 335 is generally made of a permeable ferromagnetic material and is disposed immediately on top of the cylindrical magnet 330 within the cylindrical 315.

The recording head element 270 has a generally rectangular outline, and includes a left module 272 and a right module 274 that are formed on either side of the centerline of the recording head element 270. The flat ribbon cables 280, 285 carry the electrical current to the recording head element 270 via a connection to the left and right modules 310 and 315, respectively.

The flexure elements 340, 345 are generally similar in shape and construction. Each flexure element, e.g., 340 includes a thin rectangular cutout with a substantially arcuate interior feature that allows the flexure element 340 to engage the coil of the voice coil actuator 275. The flexure element 340 is disposed against the bottom surface of the rectangular recess 295 to connect the coil to the flexure element 340.

During a track following operation, the voice coil actuator 275 actuates the flexure elements 340, 345 to cause them to undergo a flexural deflection. This deflection enables the recording head element 270 to move along the lateral direction in order to follow a target data track on the magnetic tape 225.

Figure 6:
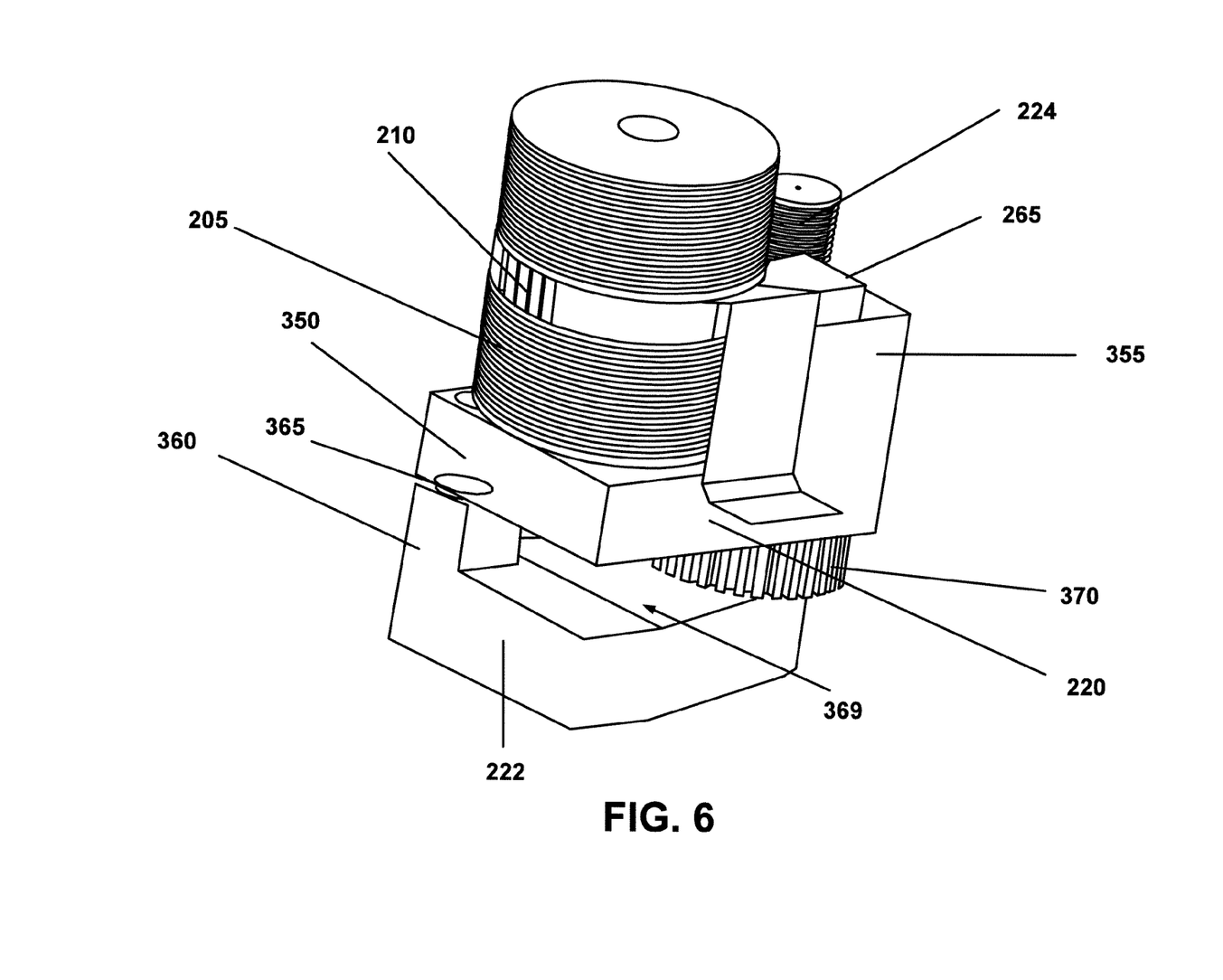
FIG. 6 is a perspective view of the grooved roller guide assembly of FIG. 3 shown with the recording head actuator assembly of FIG. 4 and a coarse lead screw actuator mounted on top and bottom support bases.

With reference to FIG. 6, the grooved roller guide assembly 205 and the recording head actuator assembly 210 are assembled within the circumferential slot 255 (FIG. 3), as an integral unit. The grooved roller guide assembly 205 is mounted directly on top of the top support base 220, which, in turn, is attached to the bottom support base 222.

The top support base 220 is formed of an L-shaped bracket that includes a rectangular base 350 and a rectangular riser 355. The rectangular base 350 provides a mounting surface for the grooved roller guide assembly 205. The rectangular riser 355 rises above the rectangular base 350 to a height immediately below the U-shaped carrier 265, which rests thereupon. The lead screw actuator 224 extends through an opening within the U-shaped carrier 265, adjacent to the rectangular riser 355.

The bottom support base 222 has a generally substantially rectangular shape. A block 360 extends from the bottom support base 222 and connects the top support base 220 to the bottom support base 222, via a pin 365. The top support base 220 and the bottom support base 222 are separated by a gap 369, where a gear 370 is disposed. The gear 370 is further connected to the lead screw actuator 224 to provide a driving mechanism for a coarse actuation.

Generally, during a read/write operation, the coarse actuation is used for data band access and for following a large slow lateral motion of the magnetic tape 225. Generally, the tape width is subdivided into several databands. To access a different data band or track on the magnetic tape 225, a voltage command signal is sent to the gear 370 to cause it to rotate. The rotation of the gear 370 results in a rotation of the lead screw actuator 224 that is connected thereto. The resulting rotation of the lead screw actuator 224 thus causes the grooved roller guide assembly 205 to undergo a translational motion along the lateral direction, so as to position the recording head actuator assembly 210 at the desired data band or track on the magnetic tape 225.

Figure 7:
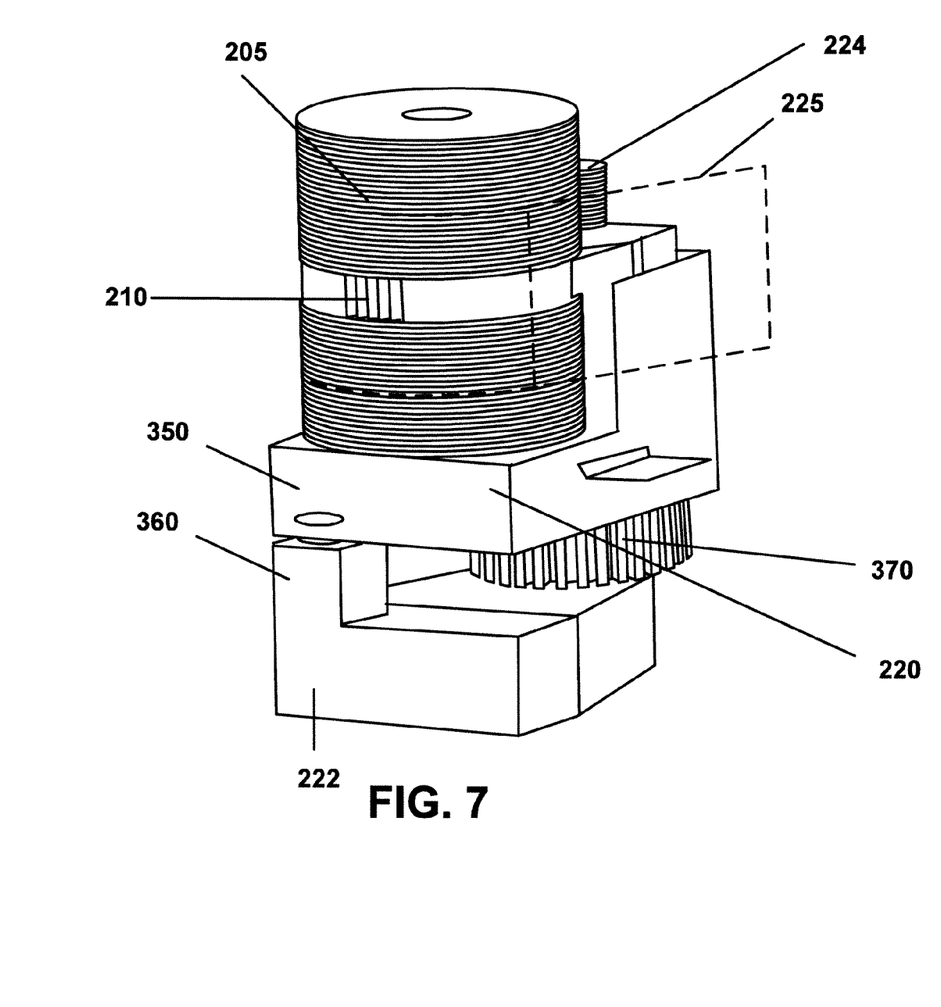
FIG. 7 is a perspective view illustrating a portion of the magnetic tape wrapped around the grooved roller guide assembly of FIG. 3, which contains the recording head actuator assembly of FIG. 4 therein.

In connection with FIG. 7, the magnetic tape 225, shown in dashed lines, passes over the grooved roller guide assembly 205 where the recording head actuator assembly 210 is disposed. As the magnetic tape 225 translates along the tape path, prior to arriving at the grooved roller guide assembly 205, a lateral disturbance may be generated as it passes through the roller guide assemblies 215. As the magnetic tape 225 comes into a direct contact with the circumferential grooves 260, a significant frictional contact force is developed therebetween. This frictional contact force causes the magnetic tape 225 to move with the grooved roller guide assembly 205, thereby significantly reducing any relative motion developed between the magnetic tape 225 and the grooved roller guide assembly 205. This effectively reduces the amplitude of the lateral motion of the magnetic tape 225. Moreover, since the inertia of the grooved roller guide assembly 205 is substantially greater than the inertia of the magnetic tape 225, high frequency lateral disturbances generally are significantly reflected and dampened at the grooved roller guide assembly 205.

Thus, the present invention as embodied by the grooved roller guide assembly substantially improves the performance of the linear tape drive system 200 by concurrently reducing the amplitude as well as high frequency components of the lateral motion of the magnetic tape 225. The amplitude reduction of the lateral motion of the magnetic tape 225 thus enables the recording head actuator assembly 210 to perform a track following operation much more effectively. Also, the reduction in the high frequency components allows the track following servo control to capture the frequency of the lateral motion of the magnetic tape 225 within the control bandwidth. This directly results in a reduction in the track following error in the linear tape drive system 200.

Figure 8:
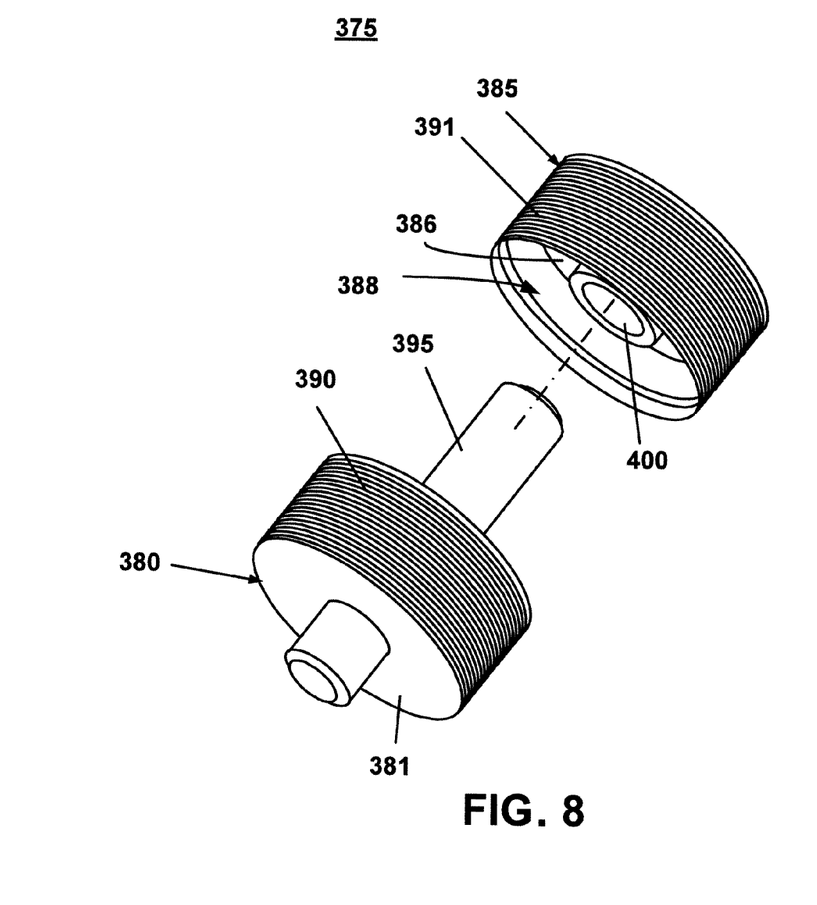
FIG. 8 is a perspective view of an alternative embodiment of the grooved roller guide assembly of FIG. 2 provided with two removable cylindrical hollow surfaces designed to accommodate a recording head actuator assembly therebetween.

FIG. 8 illustrates an alternative embodiment of a hollow two-piece grooved roller guide assembly 375 according to the present invention. The grooved roller guide assembly 375 is generally formed of two hollow cylinders 380, 385 having the same outer diameter. A plurality of external circumferential grooves 390, 391 are formed on the outer surfaces of the two hollow cylinders 380, 385, respectively.

The circumferential grooves 390, 391 have a raised profile. A connecting shaft 395 connects the two cylinders 380, 385 through a circular bushing 400. The hollow cylinders 380, 385 are interconnected in such a way that their hollow interior volumes are oppositely disposed from each other. The connecting shaft 395 and the two hollow cylinders 380, 385 are fabricated as individual units and are then assembled in a manner that allows them to be completely dismantable. Hollow cylinder 380 includes a bottom cap 381, and hollow cylinder 385 includes an upper cap 386. When the two hollow cylinders 380, 385 are assembled, an internal chamber 388 is formed therebetween.

Figure 9:
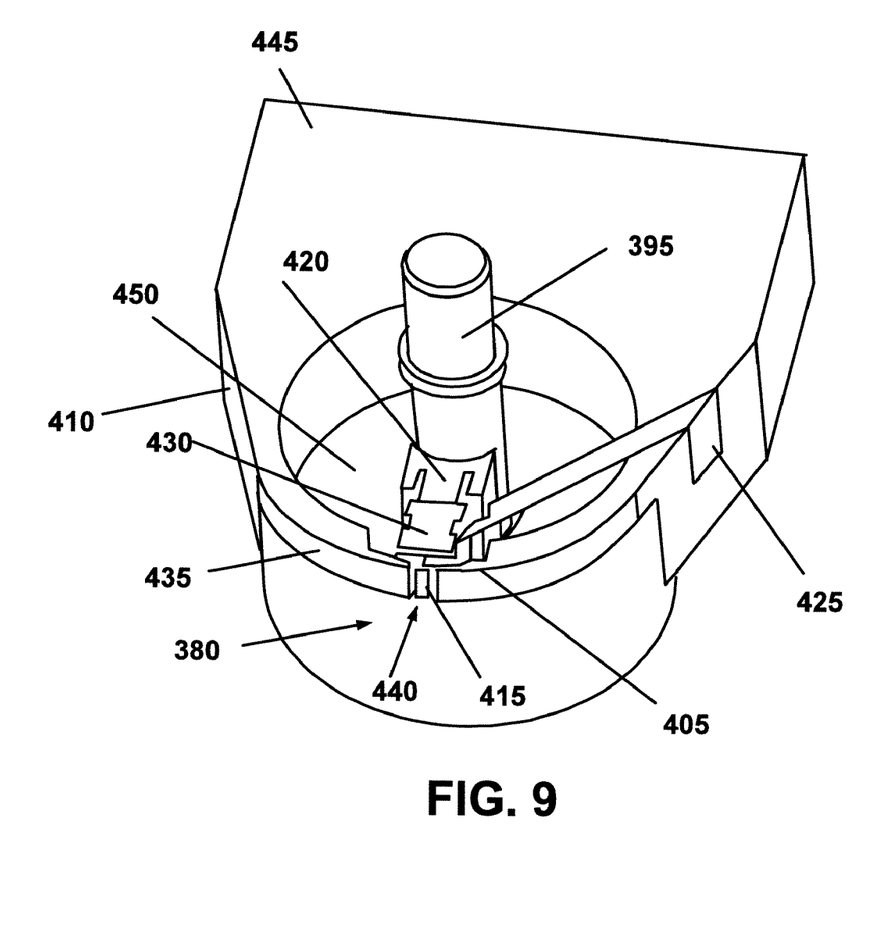
FIG. 9 is a perspective view of an alternative embodiment of the recording head actuator assembly designed to fit within the hollow interior of the grooved roller guide assembly of FIG. 8.

With further reference to FIG. 9, the grooved roller guide assembly 375 is designed to accommodate a recording head actuator assembly 405 that is not constrained by the same or similar design as the recording head actuator 210. The recording head actuator assembly 405 is disposed within the hollow interior volume formed by the two hollow cylinders 380, 385. The recording head actuator assembly 405 is shown disposed atop the bottom cap 381 of the hollow cylinder 380.

The recording head actuator assembly 405 is generally comprised of a carrier 410, a recording head element 415, a short stroke voice coil actuator 420, and a ribbon cable 425. The voice coil actuator 420 is attached to the connecting shaft 395 and is further connected to the recording head element 415. A flexure element 430 is disposed adjacent to the voice coil actuator 420 and the recording head element 415. The flat ribbon cable 425 connects the recording head element 415 to an electrical voltage source that registers signals generated by the recording head element 415.

The carrier 410 is disposed atop the hollow cylinder 380. A constant width cylindrical portion 435 is formed as a feature of the carrier 410 and has a generally rectangular cutout 440 to provide a physical space, so that the recording head element is accessible to the magnetic tape 225. A faceted flat portion 445 is connected to, and oppositely disposed from the cylindrical portion 435. A circular cavity 450 is formed within the carrier 410 to allow the recording element 415 and the voice coil actuator 420 to be disposed completely within the hollow cylinder 380. To complete the hollow two-piece grooved roller guide assembly 375, the hollow cylinder 385 is inserted onto the connecting shaft 395 through the circular bushing 400.

As the active span of the recording head actuator assembly 405 becomes smaller to accommodate a mechanical expansion of the magnetic tape 225 with a higher track density, the hollow two-piece grooved roller guide assembly 375 could present an advantage over the grooved roller guide assembly 205 in that it allows for a higher performance recording head actuator assembly with a design that can be physically accommodated by the hollow interior volume within the hollow two-piece roller guide assembly 375. Moreover, it also offers added physical space for routing electrical wires.

It is to be understood that the specific embodiments of the invention that have been described are merely illustrative of certain applications of the principle of the present invention. Numerous modifications may be made to the system for substantially improving track density in linear tape drive systems, as described herein, without departing from the spirit and scope of the present invention.

What is claimed is:

1. A linear tape drive apparatus, comprising:
   an integrally formed roller guide assembly having a plurality of outer circumferential grooves and a circumferential slot;
   the roller guide assembly engaging a tape and rotating in response to translational movement of the tape, wherein air passes between the circumferential grooves so that the circumferential grooves generate a frictional contact force between the roller guide assembly and the tape; and
   a recording head actuator assembly disposed, at least in part, within the circumferential slot for engaging the roller guide assembly.

2. The linear tape drive apparatus of claim 1, wherein the roller guide assembly includes two cylindrically shaped contact surfaces that are separated by the circumferential slot; and
   wherein the two contact surfaces contact the tape.

3. The linear tape drive apparatus of claim 2, wherein the circumferential slot is centrally located relative to the two contact surfaces.

4. The linear tape drive apparatus of claim 3, wherein the two contact surfaces have the same diameter.

5. The linear tape drive apparatus of claim 4, wherein the roller guide assembly further comprises an axially disposed shaft that connects the two contact surfaces.

6. The linear tape drive apparatus of claim 5, wherein the two contact surfaces have the same diameter.

7. The linear tape drive apparatus of claim 6, wherein the recording head actuator assembly includes a U-shaped carrier that engages the shaft.

8. The linear tape drive apparatus of claim 7, wherein the recording head actuator assembly further includes a recording head element, a voice coil actuator, and two ribbon cables that are electrically connected to the recording head element.

9. The linear tape drive apparatus of claim 8, wherein the U-shaped carrier is made from a permeable ferromagnetic material.

10. The linear tape drive apparatus of claim 9, further comprising a supply reel and a takeup reel; and
    wherein the tape translates between the supply reel and the takeup reel.

11. A linear tape drive apparatus, comprising:
    a roller guide assembly including two hollow, cylindrically shaped contact surfaces that define an internal chamber;
    the contact surfaces including a plurality of outer circumferential grooves;
    a recording head actuator assembly disposed within the internal chamber of the roller guide assembly; and
    wherein the contact surfaces of the roller guide assembly engage a tape and rotate in response to translational movement of the tape, wherein air passes between the circumferential grooves so that the circumferential grooves generate a frictional contact force between the roller guide assembly and the tape.

12. The linear tape drive apparatus of claim 11, including a gap between the contact surfaces.

13. The linear tape drive apparatus of claim 12, wherein the two contact surfaces have the same diameter.

14. The linear tape drive apparatus of claim 13, wherein the roller guide assembly further comprises an axially disposed shaft that connects the two contact surfaces.

15. The linear tape drive apparatus of claim 14, wherein the two contact surfaces have the same diameter.

16. The linear tape drive apparatus of claim 15, wherein the recording head actuator assembly includes a recording head element, a voice coil actuator, and two ribbon cables that are electrically connected to the recording head element.

17. The linear tape drive apparatus of claim 16, further comprising a supply reel and a takeup reel; and
    wherein the tape translates between the supply reel and the takeup reel.

18. A tape recording apparatus, comprising:
    a rotatable roller having a slot therein;
    a recording head disposed in the slot, thereby permitting the recording head to contact a tape that is moving with respect to the recording head, wherein the roller has a surface that makes contact with the tape so that the tape and the surface move together as the tape moves across the recording head; and
    an actuator that controls movement of the recording head transverse to the direction of tape motion, wherein the recording head is movable within the slot;
    wherein the roller is substantially cylindrical in shape and has grooves therein to facilitate contact between the roller and the tape.

19. The apparatus of claim 18, wherein the recording head protrudes from the slot.

20. The apparatus of claim 18, wherein the actuator is located within the roller.

21. The apparatus of claim 18, wherein the roller includes a raised profile that acts as a hydrodynamic air bearing surface for the tape, thereby preventing the tape from sagging into the slot.

22. The apparatus of claim 21, wherein the air bearing surface is configured to control a wrap angle on the recording head.

23. The apparatus of claim 22, wherein a slot in the roller controls the wrap angle.

24. The apparatus of claim 18, wherein the actuator is a high frequency, short stroke tracking system.

25. The apparatus of claim 18, wherein the recording head is movable within the slot by approximately 0.1 mm to 0.2 mm.

26. A tape recording apparatus, comprising:

a rotatable roller having a slot therein; and a recording head disposed in the slot, thereby permitting the head to contact tape that is moving with respect to the recording head, wherein the roller has a surface that makes contact with the tape so that the tape and the surface move together as the tape moves across the recording head, the tape rotates the roller, and the roller is substantially cylindrical in shape and has grooves therein to facilitate contact between the roller and the tape.

27. The apparatus of claim 26, further comprising a supply reel and a take-up reel for the tape.

* * * * *